Aug. 21, 1945.  T. ULRICH  2,383,428
DOOR SUSPENSION FOR VEHICLES ESPECIALLY AUTOMOBILES
Original Filed July 17, 1941  2 Sheets-Sheet 1
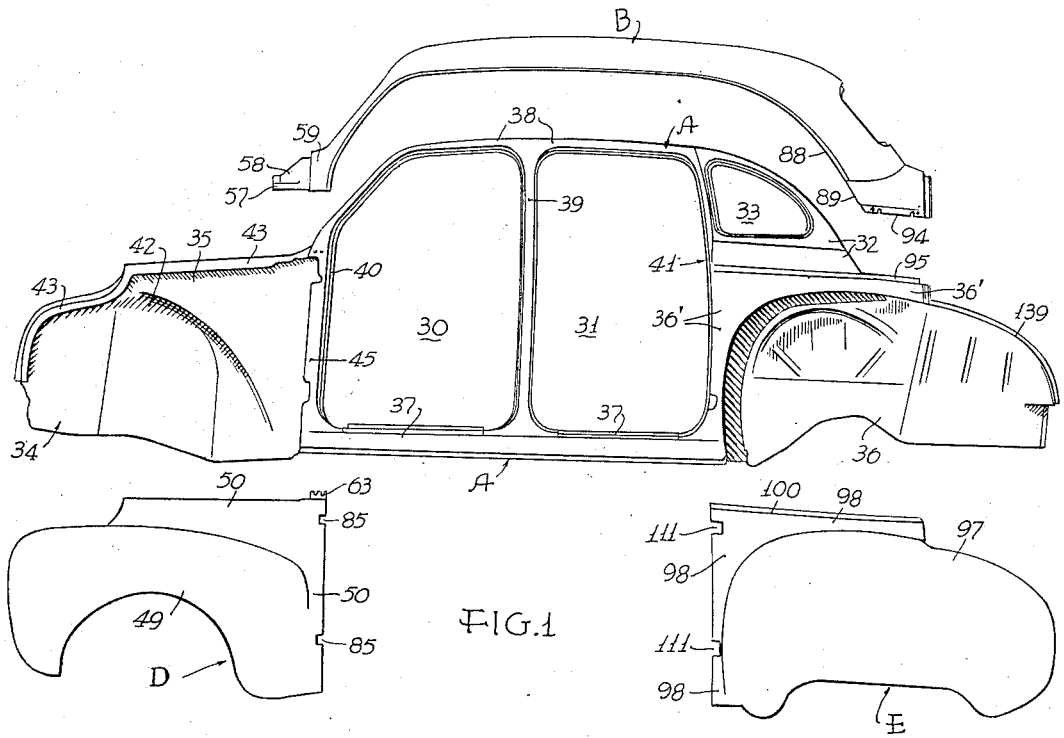
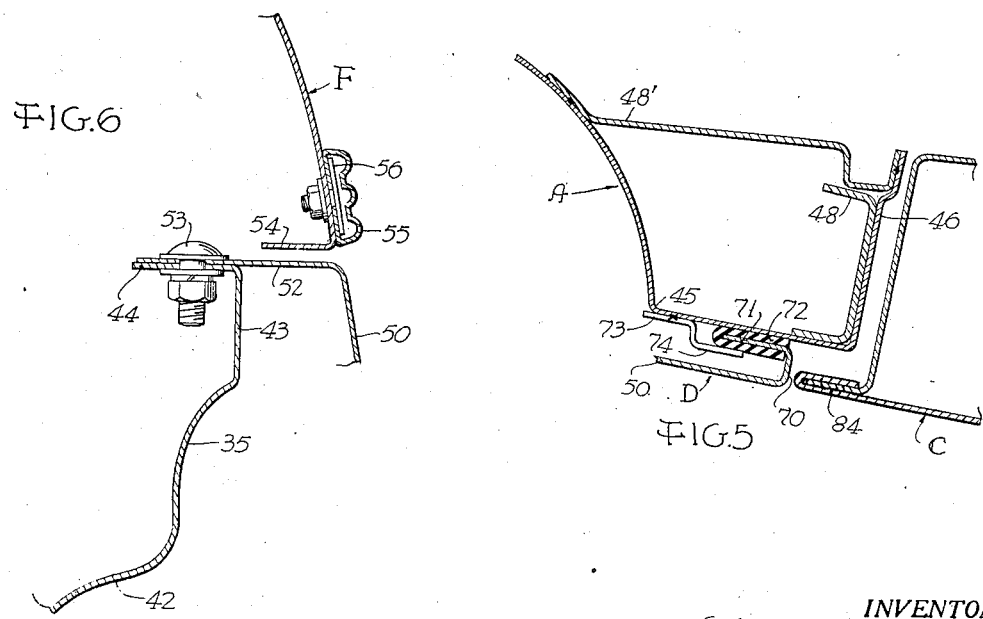
INVENTOR
Theodore Ulrich
BY John P. Tarbot
ATTORNEY

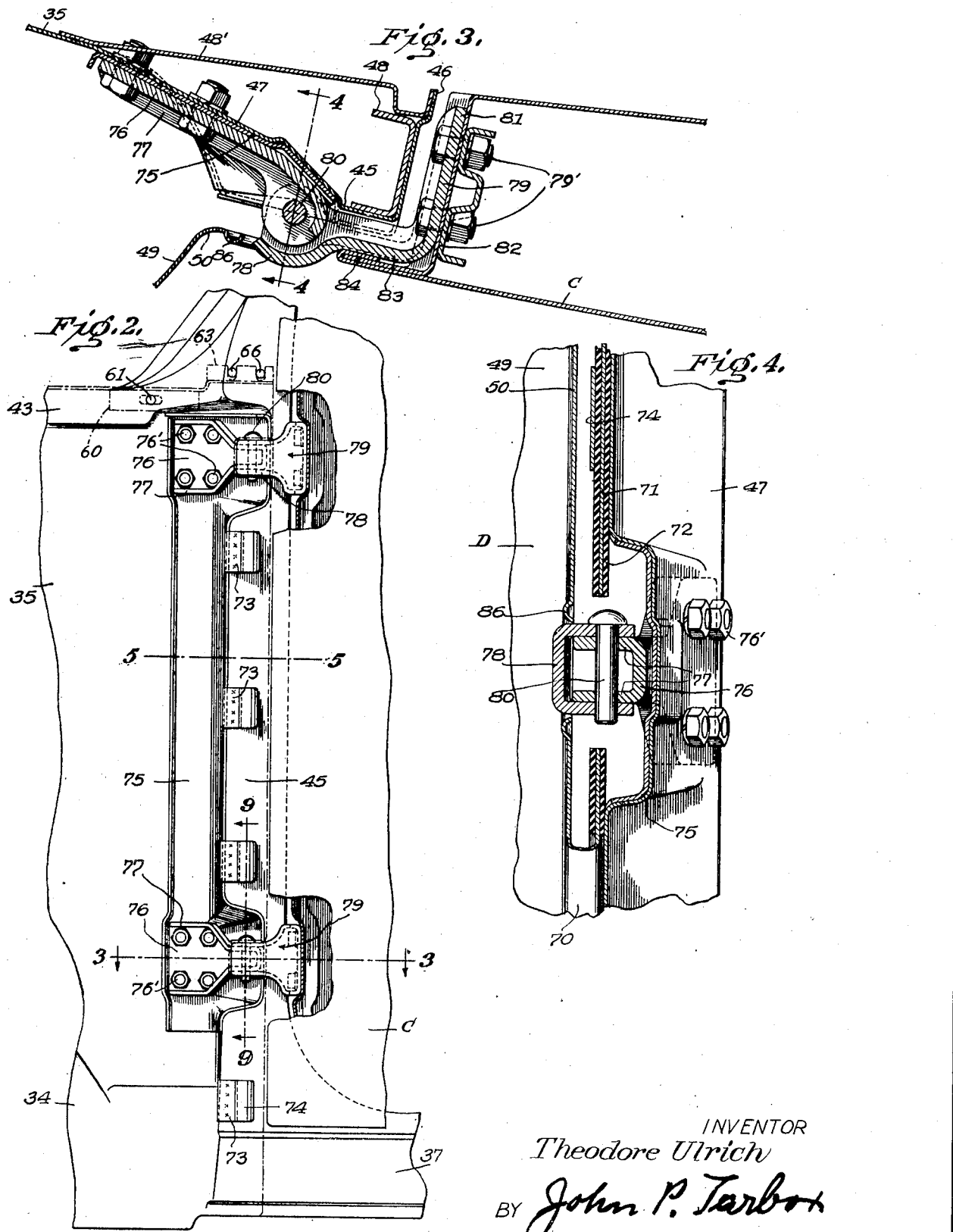

Patented Aug. 21, 1945

2,383,428

UNITED STATES PATENT OFFICE 2,383,428

DOOR SUSPENSION FOR VEHICLES, ESPECIALLY AUTOMOBILES

Theodore Ulrich, Bridgeport, Conn., assignor to Edward G. Budd Manufacturing Company, Philadelphia, Pa., a corporation of Pennsylvania Original application July 17, 1941, Serial No. 402,878. Divided and this application April 3, 1942, Serial No. 437,500

2 Claims. (Cl. 296—28)

The invention relates to improvements in the suspension for the doors of vehicles and more particularly of automobiles.

Among the objects of the invention is a door suspension which does not require the strength-diminishing cut-outs of the door posts which had hitherto been necessary for so-called concealed hinges.

Other objects of the invention and its advantages and features will become apparent from the following description of an embodiment and the illustration of the latter in the attached drawings.

In the drawings:

Figure 1 is an exploded view of one side wall member, the appertaining fenders, and of an automobile roof of the body adapted for the invention;

Figure 2 is a fragmentary side elevation of the body in the region of the lower section of a front door post showing the hinges for the front door and the adjacent section of the door;

Figure 3 is a horizontal section through one of the front door hinges and the adjacent body and door portions along line 3—3 of Figure 2, yet on a larger scale;

Figure 4 is a fragmentary section along line 4—4 of Figures 2 and 3 on about the scale of Figure 3, showing in section also a portion of the fender which is, for the sake of clarity, omitted in Figure 2;

Figure 5 is a section through the front door post and adjacent side wall and front door post portions along the line 5—5 of Figure 2 on about the same scale as Figures 3 and 4;

Figure 6 is a vertical fragmentary section through the fender, the adjacent motor compartment wall and the motor hood in the region where these members meet.

The body superstructure shown in the drawings comprises as large units or one-piece stampings: the side wall units or stampings A; the combined windshield-, roof-, and rear wall-stamping or unit B; the doors C, the front fenders D, the rear fenders E, and the motor hood F.

The side wall units or stampings A extend practically over the entire length of the automobile so as to surround the door openings 30, 31, and so as to form the upper portion of the rear quarter side panel 32 with the rear quarter side window 33, the front wheel housing 34 and the remaining portion 35 of the motor compartment side wall, the rear wheel housing 36 and adjacent lower panel portions 36', the threshold portions 37, the upper door rail portions 38, the middle door post 39, the front door post portion 40, and the rear door post portion 41.

The front wheel housing 34 comprises the generally vertical skirt and the crown 42, which latter merges into the motor compartment side wall portion 35. The portion 35 is outwardly offset at 43 along its upper margin, which offset is forwardly continued along the forward part of the wheel housing 34, as shown in Figure 1. An inwardly extending flange 44 is provided along the greater part of the offset portion 43.

The rear marginal portion of the wall 35 is likewise outwardly offset at 45 and then provided with an inwardly directed flange 46 which forms the jamb face of the front door post. An inclined portion 47 connects the offset portion 45 and the main body of the portion 35. The flange 46 is reinforced by U-section rail 48 which nests in the angle formed by the offset 45 and the flange 46 and is connected with these portions. The space between the inner margin of the flange 46 and the main body of panel portion 35 is bridged by a panel 48' so that a closed box-sectional lower post structure is formed.

The front fender unit D comprises the fender portion 49 proper and upwardly and rearwardly extending panel portions 50. The forward marginal portions of the fender 49 proper and the forward upper margins of the panel portion 50 are provided with inwardly directed flanges 52 which overlap and are connected, such as by bolts and nuts 53, to the flange 44 of the wheel housing and side wall panel portions 34, 35.

The ledge formed by the flange 52 is covered by the marginal portion 54 of the hood F. The margin of the hood F which overlies flange 52 is arranged at the height of the belt-line and provided with a belt-line molding 55 held by clips or the like 56.

The rearward portion of flange 44 is connected to the marginal portion 57 of the cowl extension 58 which forms part of the windshield-, roof-, rear-wall-unit B. Flange 44 and the marginal portion 57 are rigidly secured in the finished body to one another such as by spot welding. Slightly in front of the cowl portion 59 proper, the flange 52 of the wheel housing member D is provided with a downwardly directed flange 60. A bolt (not shown) is fastened to said flange 60 and extends through a hole 61 the side wall offset 43 and the downwardly extending marginal portion 57 of the cowl extension 58. In the region of the cowl 59 proper and of the front or A-post, the fender unit D has its flange 52 upwardly extended at 63. The extension 63 is attached by a couple of bolts to the side wall A which is provided for this purpose with holes 66.

The front fender unit D is provided along its rear margin with a narrow inwardly directed flange 70 which is continued by a forwardly directed flange or tabs 71. This flange 71 is covered continuously or at certain intervals with a rubber or the like cover 72. Z-shaped clips 73 are attached to the offset portion 45 of the side wall unit and the flange 71 is slid from the rear under the outwardly offset arms 74 of these clips and held there firmly and without danger of rattling due to the resiliency of the clips and of the rubber covering 72.

The side wall portion 47 is reinforced below the belt-line by a stamping or the like 75. One member 76 each of two vertically spaced hinges is fastened to the side wall at the ends of the reinforcing member 75. These members 76 are reinforced by marginal flanges 77 which converge toward the rear of the car and form together with the remaining main portion of the member 76 a narrow U-section member. The correspondingly shaped outer end 78 of the second hinge member 79 is slid over the rear end of the member 76 and the two ends are journalled to one another by a hinge pin 80. The open sides of the ends of the two hinge members 76 and 79 face toward each other.

Whereas the hinge member 76 is substantially straight, the hinge member 79 is angle formed in plan view—Figure 3. The inner arm 81 of the hinge member 79 is secured to the hinge rail 82 of the front door C, and the other arm 83 is arranged on the inside of the door overlap flange 84. It will be noted that the door post portions 45, 47, 75 are only slightly recessed at the location of the hinges, but that there are no interruptions or openings in the post for the entrance of any hinge members, as they are usual with the customary hinges of the concealed type.

The front fender unit D is provided with cutouts 85 at the location of the hinges and the margins of these cut-outs are reinforced by pressed-out beadings 86—Figures 3 and 4. These cut-out portions are practically completely closed by the forward portion 78 of the respective hinge arm 83. This portion 78 is curved concentrically to the axis of the hinge pin 80 so that in all positions the cut-out portions 85 are nearly completely covered.

After the assembly of the stationary parts of the body and the attaching of the front door hinges by the bolts 76' and 79', the flange 71 of the front fender unit D is slid from the rear under the arms 74 of the clips 73, then fastened by its flanges 63, 60, 52 and by means of the bolts 53 and those passing through holes 61 and 66 to the margins of the side wall portion 35 and of the wheel housing 34. The connection in the cowl and D post region is then covered by a moulding strip (not shown).

The construction of the upper portion of the front door post 40, of the header rail 38 above the door openings 30, 31, of the rear quarter side window 33, as well as of the adjacent parts of the windshield-, roof-, and rear-wall-unit B, and the relative arrangement of these members and their connection may be conventional and is, therefore, not shown or described in detail. The connection between the units A and B is hidden from view for the greater part of its length by the drip channel 88 so that only the short seam 89 between the end of the channel 88 and the belt-line requires a careful finishing operation.

The lower horizontal side margin of the unit B in rear of the seam 89 is inwardly and downwardly offset at 94—Figure 1—so that the offset marginal portion 94 overlies and is fastened, such as by spot welding, to the marginal portion 95 of the panel portion 36' below the belt-line. The rear fender unit E comprises a fender portion 97 proper and upwardly and forwardly extending panel portions 98. The upwardly extending panel portion 98 is inwardly and upwardly offset at 100. The offset portion 100 is fastened to the side panel portions 95 and the connection is covered by a moulding (not shown). The fender E is furthermore fastened along the lid opening margin 139. The construction of this connection along lines 95, 100 and 139 between the fender E and the units A and B is similar to the construction for the front fender. The fender unit E is connected along its front margin to the post 4 in a manner which corresponds to the construction of the front fender D and its connection as shown in Figure 5.

The main portion of the panel 36' in the rear of the jamb face along the rear door post 41 forms, together with the front margin of the fender unit E, a rabbet for the reception of the overlap flange of the rear door C. The same is of course also true for the front fender flange 70, the panel portion 45 and the overlap flange 84 of the front door—Fig. 5. The fender unit E is provided with cut-outs 111 similar to the cut-outs 85 of the front fender, which are filled in by the rear door hinges the construction and arrangement of which may be very similar to the construction and the arrangement of the corresponding parts of the front hinges.

The disclosed hinge suspension, in which the hinge attaching portion 47 of the body wall is spaced from and faces the detachable panels 49, 50, has the advantage that, upon removal of the detachable panel the fastening means for the hinge end is freely accessible from the outside, and the further advantage that the securing zone for the hinge member 76 may be much longer than the width of the jamb face 46 of the door posts.

All modifications of the invention which will occur to those skilled in the art are intended to be covered by the appended claims, with the exception of such features as are covered by the claims of applicant's co-pending application Serial No. 402,878, "Body for vehicles, especially for pleasure automobiles," filed July 17, 1941, of which the present application is a division.

What is claimed is:

1. In a vehicle body, a wall defining an opening, a closure member within said opening, a hinge post on said body wall along one margin of said opening, a hinge rail on said closure member adjacent said hinge post, a hinge comprising two journalled members, the first one of said hinge members being fastened to said post from the outside in a region spaced from the margin and away from the center of the opening, the second one of said hinge members being attached to said hinge rail of the closure member and having a portion overlapping the outer surface of said hinge post, a panel removably attached to said post and overlying the outer side of the latter, said panel constituting in its region the outer surface of the body and being provided with a cut-out portion in front of said hinge, said cut-out portion being closed by a portion of said second hinge member when said closure member is in the closed position and permitting swinging movement of said second hinge member, the connection between said first hinge member and said post becoming accessible upon the removal of said panel, said hinge post comprising a rail member extending transversely to said wall and along said opening and an inner panel member extending at an angle to the plane of the removable panel and structurally connected to the outer marginal portion of said rail member, said panel member constituting part of the inner body wall, said first hinge member being fastened to the outside of said panel member which latter is covered by said removable panel.

2. In a vehicle body, a wall surrounding an opening, a closure member for said opening, a panel readily detachably secured to said wall and presenting part of the outer body surface adjoining one margin of said opening, hinge members respectively secured to said closure member and said wall near said margin, the hinge member secured to said wall being arranged behind said panel and the hinge attaching portion of the wall being spaced from and facing the detachable panel so that it becomes easily accessible for removal or securement upon removal of said panel.

THEODORE ULRICH.